(12) United States Patent
Pringle et al.

(10) Patent No.: US 9,002,767 B2
(45) Date of Patent: Apr. 7, 2015

(54) SYSTEM AND METHOD FOR MANAGING ELECTRIFIED PARKING SPACE UTILIZATION

(71) Applicants: Kenneth E. Pringle, Belmar, NJ (US); Roy Russell, Sandwich, NH (US); Robin Chase, Sandwich, NH (US)

(72) Inventors: Kenneth E. Pringle, Belmar, NJ (US); Roy Russell, Sandwich, NH (US); Robin Chase, Sandwich, NH (US)

( * ) Notice: Subject to any disclaimer, the term of this patent is extended or adjusted under 35 U.S.C. 154(b) by 245 days.

(21) Appl. No.: 13/738,282

(22) Filed: Jan. 10, 2013

(65) Prior Publication Data

US 2013/0179383 A1  Jul. 11, 2013

Related U.S. Application Data

(60) Provisional application No. 61/584,960, filed on Jan. 10, 2012.

(51) Int. Cl.
*G06F 17/00* (2006.01)
*G06N 5/02* (2006.01)
*B60L 11/18* (2006.01)
*G06N 7/00* (2006.01)

(52) U.S. Cl.
CPC ............. *G06N 5/02* (2013.01); *B60L 11/1824* (2013.01); *G06N 7/005* (2013.01)

(58) Field of Classification Search
CPC ........................................................ G07B 15/02
USPC ............................................... 706/45; 705/13
See application file for complete search history.

(56) References Cited

U.S. PATENT DOCUMENTS

| 6,340,935 B1* | 1/2002 | Hall ........................... 340/932.2 |
| 2011/0093314 A1* | 4/2011 | Redmann et al. ............... 705/13 |
| 2011/0213656 A1* | 9/2011 | Turner ........................ 705/14.49 |
| 2012/0130891 A1* | 5/2012 | Bogaard et al. ................. 705/40 |
| 2013/0073350 A1* | 3/2013 | Blustein ......................... 705/13 |

* cited by examiner

*Primary Examiner* — Alan Chen
(74) *Attorney, Agent, or Firm* — Dilworth & Barrese, LLP.

(57) ABSTRACT

The present disclosure provides systems and methods directed to managing parking space utilization and, more particularly, to maintaining a usage record and controlling access to on-street and other public charging spaces for electric vehicles, plug-in hybrid electric vehicles and other vehicle types, such as high efficiency fuel powered vehicles, for which preferential parking may be desirable.

25 Claims, 6 Drawing Sheets

SYSTEM AND METHOD FOR MANAGING ELECTRIFIED PARKING SPACE UTILIZATION

FIELD OF THE INVENTION

The present disclosure relates generally to managing parking space utilization and, more particularly, to maintaining a usage record and controlling access to on-street and other public charging spaces for electric vehicles, plug-in hybrid electric vehicles and other vehicle types, such as high efficiency fuel powered vehicles, for which preferential parking may be desirable.

BACKGROUND OF THE INVENTION

The broad-scale public acceptance of electric vehicles (EVs) and plug-in hybrid electric vehicles (PHEVs) will likely depend upon a number of factors. These factors include the development of a network of easily accessible charging spaces where owners of PHEVs and EV scan charge their vehicles when not in use. Initially, development of the market for charging spaces will likely focus on the dedicated user market, meaning electrified parking spaces (hereinafter "EP spaces") (i.e., parking space served by electric charging stations) located at places of employment, in parking structures, or in public parking areas for the regular use of electrified fleet vehicles or specific private owners of EVs and PHEVs. The nature of this "dedicated market" is such that as the number of EVs and PHEVs grows over time, the supply of EP spaces for dedicated users will likely expand in unison with demand.

During this period of transition, it can be reasonably anticipated that supply of and demand for charging spaces will be frequently out of balance. As demand for EP spaces grows, entrepreneurs will seek to serve the at-large market by installing charging stations at parking spaces on both public and private property. The growth of this market, however, will likely be constrained by the competing demands of conventional vehicle owners for a limited supply of parking spaces. Conventional vehicle owners will likely resent the loss of available public parking spaces to EV and PHEV users unless those spaces are used as frequently as other parking spaces in the area. Local political pressure may limit the growth of the EV and PHEV market unless sufficient demand for EP spaces can be demonstrated to warrant the removal of another parking space from the supply previously available to conventional vehicle owners. Monitoring the growth of demand for EP spaces and mediating the competing demands parking spaces by owners of conventional vehicles on an individual parking space-by-parking space basis would be enormously cumbersome, particularly for public parking sponsors, such as municipalities or parking authorities.

A primary focus of concern going forward will be managing the availability of a number of parking spaces some of which may be equipped with electric charging stations ("ECs") such that an adequate supply of locations for charging EVs, PHEVs, as well as parking for other preferred vehicle types ("PVTs"), such as high-efficiency fuel powered vehicles, as may be designated by a parking sponsor, while minimizing the number of parking spaces made unavailable to conventional vehicles. This concern will grow as developments in electric charging station technology—particularly the development of rapid charging technologies over the coming decade that will enable EVs and PHEVs to be charged in as little as 10 minutes—will increase the demand for EP spaces while also intensifying competition with conventional vehicle owners for the limited supply of public parking.

Therefore, there is a need for an improved management system and associated processes for managing electrified parking space utilization.

SUMMARY OF THE INVENTION

Certain objects, advantages and novel features of the disclosure will be set forth in part in the description that follows and in part will become apparent to those skilled in the art upon examination of the following or may be learned with the practice of the disclosure. The objects and advantages of the disclosure may be realized and obtained by means of the instrumentalities and combinations particularly pointed out in the appended claims.

A primary but not exclusive object of the present disclosure is to provide a system and method for managing utilization of EP spaces by maintaining a usage record and controlling access to EP spaces during periods they are most likely to be used by EVs, PHEVs or PVTs.

The present disclosure provides an efficient system and associated method of monitoring and controlling access to EP spaces in a defined region. In a preferred embodiment, the present disclosure is directed to a computerized system for monitoring, reporting, managing, and controlling access to on-street and other public EP spaces for EVs, PHEVs and PVTs without unduly limiting the supply of parking spaces available for use by conventional vehicle owners.

In accordance with a broad aspect of the disclosure, a system embodiment is provided having a parking facility control center in communication with one or more EP spaces interfaced to the parking facility control center via wireless transceivers that transmit and/or receive data to and from the control center. It should be appreciated that a portion of the information communicated includes data that uniquely identifies each of the one or more EP spaces.

The system embodiment is configured to process information at the parking facility control center, collected from the one or more EP spaces. The parking facility control center is configured to include at least one processor adapted to monitor the usage of the one or more EP spaces, calculate an aggregate demand for the one or more EP spaces in accordance with a demand profile based on present, historical and calculated future demand for the EP spaces, and assign, based on the calculations performed, a priority parking designation to each of the EP spaces which determines the type of vehicle that is allowed to park in the EP space for a predetermined period based on a vehicle's pre-assigned category designation.

In one system embodiment, the parking facility control center includes at least one processor coupled to a memory and display device, a database configured to store a plurality of tables including data to allow the processor to determine an appropriate number of EP spaces to be restricted for use by EVs, PHEVs and/or PVTs and a remaining balance of EP spaces permitted to be used by all vehicle types including, conventional vehicles; the processor being coupled to the database via a database interface effective to manage the data stored in the parking database. The system embodiment further comprises a plurality of electric charging stations and associated display and transmission hardware/software associated with each of the plurality of spaces.

According to another aspect of the disclosure, there is provided a method embodiment of managing electrified parking space utilization in a prescribed geographic area by maintaining a usage record and controlling access to on-street and other public charging stations for EVs, PHEVs and PVTs. The method embodiment comprises steps of:

(a) monitoring by a processor a plurality of parking spaces including both EP spaces and non-EP spaces in said prescribed geographic area, (b) calculating by the processor an aggregate demand for the plurality of EP spaces in accordance with a demand profile based on present, historical and calculated future demand for the plurality of EP spaces, and (c) assigning by the processor, based on said calculations, a priority parking designation label to each of the EP spaces which determines the type of vehicles that are allowed to park in the EP spaces for a designated period.

According to one aspect, the historical demand for the EP spaces may be based on one or more of: historical use of both EP spaces and non-EP spaces, reservation history, specific user histories and weather history.

According to another aspect, the method embodiment may further comprise providing signaling indicia to indicate status changes to/from restricted/unrestricted status, the period that status will be in effect and with respect to restricted status identifying the specific vehicle type(s) permitted (e.g., EVs, PHEVs, and/or other designated PVTs).

In another aspect, the calculated predictive aggregate demand for the EP spaces may be a weighted summation of the historical, present and future calculated demand.

In yet another aspect, the calculating step performed by the processor may be performed at prescribed time intervals. In one embodiment, the prescribed time interval is on the order of six minutes, however, other time intervals are within contemplation of the disclosure (e.g., on the order of minutes, hours, day, and so on).

In still yet another aspect, the present demand for the EP spaces comprises user queries regarding EP space availability and weather forecasts where the user queries are submitted from electric vehicle owners via one of the Internet or a smart-phone application. The future demand for the EP spaces may be calculated based at least in part on reservation trends and regional electric vehicle market growth trends.

As will become apparent, the disclosure has the advantage of accommodating the broad-scale public acceptance of EVs, PHEVs and PVTs by effectively managing the demand for EP spaces to accommodate the EV, PHEV vehicles and other vehicle types while simultaneously satisfying the competing demands of conventional vehicle owners for a limited supply of parking spaces.

In one aspect, the sponsor of the electrified parking space management system in the region is provided with the flexibility to restrict access to parking spaces to other preferred vehicle types (e.g. high efficiency fuel powered vehicles) if so desired.

BRIEF DESCRIPTION OF THE DRAWINGS

Preferred embodiments of the invention will now be described, by way of example only, with reference to the accompanying drawings, in which.

DETAILED DESCRIPTION OF THE EMBODIMENTS

In the following description, reference is made to the accompanying drawings which form a part hereof, and which shows, by way of illustration, several embodiments of the present disclosure. It is understood that other embodiments may be utilized and structural changes may be made without departing from the scope of the present disclosure.

In the following description, for purposes of explanation, numerous specific details are set forth in order to provide a thorough understanding of an embodiment of the present disclosure. It will be evident, however, to one skilled in the art that the present disclosure may be practiced without these specific details.

As will be demonstrated herein and below, the disclosure permits, among other things, the ability to monitor the usage of the one or more EP spaces, calculate an aggregate demand for the one or more EP spaces in accordance with a demand profile based on present, historical and calculated future demand for the EP spaces, and dynamically assign, based on the calculations performed, a parking designation label to each of the EP spaces which determines the type(s) of vehicle that is/are allowed to park in the EP space for a designated period, whereby the calculations may be performed in real-time, on a periodic or a periodic basis, to account for a changing access demand profile for the EP spaces For ease of illustration, disclosure embodiments are primarily discussed in the context of a parking lot that includes some number of EP spaces or area of on-street parking and some number of adjoining, conventional or non-EP spaces. However, the disclosure is not limited as such. Instead, the disclosure is suitable for use in any defined region that includes, for example, at least one parking space, or alternatively at least one or more EP spaces and at least one conventional (non EP space) under the control of a parking management entity, sometimes referred to herein as a parking "sponsor". For example, in one embodiment, the disclosure may include single EP spaces distributed throughout a geographical region, such as a multi-block radius of a town or city.

Embodiments of the present disclosure provide systems and methods for managing the availability and use of EP spaces, such that an adequate supply of locations for charging EVs and PHEVs, and for accommodating PVTs is maintained. This objective is counterbalanced by a simultaneous need to prevent or minimize a reduction in the supply of parking spaces for conventional vehicles beyond that which is needed to meet the actual demands of EVs and PHEVs.

In accordance with a broad aspect, an adequate supply of parking spaces for charging EVs, PHEVs and PVTs is maintained by a parking management system configured to monitor the availability and aggregate demand for EP spaces and responsive to said availability and demand data, assign a parking designation label that specifies the type(s) of vehicle (s) that may occupy the parking space at any point in time and for a specified duration of time. The availability and demand information for each space in any period of time constitutes a real-time demand profile that determines what constitutes an appropriate number of EP spaces for charging EVs and PHEVs and vehicles that do not need to charge based on a number of factors. These factors may differ in different applications and may include, for example, without limitation, the total number of available parking spaces, the demand for each parking space, considerations of peak and off-peak demand, weather, day of the week, time of day and so on. Various combinations of these and other factors can be considered in determining what constitutes an appropriate mix of parking space types. In the case where it is determined that there is an imbalance in the mix of parking space types, the status of one or more parking spaces designated for exclusive use by EVs or PHEVs may be changed to accommodate both electric and conventional vehicles.

According to one embodiment, the system and method is flexible to the extent that it develops a changeable set of rules based on a set of chosen factors such that an adequate supply of spaces for charging EVs or PHEVs and accommodate other PVTs is maintained, while minimizing the number of parking spaces made unavailable to conventional vehicles.

In one embodiment, it is contemplated that the status of an EP space may dynamically transition from its present status to an updated status based on a changing demand profile. Statuses may include, for example, an "exclusive" status which restricts use of the EP space exclusively to EVs and/or PHEVs, a "semi-restricted" status that restricts use to EVs, PHEVs and one or more PVTs as determined by the priorities and preferences established by the EP sponsor. A third contemplated status is an "unrestricted" status in which all vehicle types are allowed to use the EP space. Allowable status transitions may occur from any status designation to any other status designation.

In an embodiment, the present status of an EP space may be determined by an algorithm, which would take into account factors, such as, for example, historical and forecasted demand, as well as actual usage of both EP and non-EP spaces in the area in question.

In an embodiment, the status of an EP space could be set to change at pre-determined intervals, such as automatically during certain times and on certain days of the week.

In an embodiment, historical and forecasted demand may weigh recent data more heavily to identify trends and other patterns that will affect accuracy. Other factors that could be considered in determining whether to transition the status of one or more EP spaces from exclusive use to semi-restricted use or to unrestricted use may include, variations by season, day of the week and time of day, regional EV market growth and how EV trends correspond to growth, queries by EV users via the web and/or smartphone apps, reservation history, specific user history, updated user locational information, weather forecasts and history. Weather forecasts and history may account for forecasting likely demand reduction requirements that will make EP spaces unavailable for charging at peak demand times and for predicting use (e.g., ignoring EP space vacancies caused by foul weather conditions). Other weather related trends may include identifying variations in EP space usage in fair weather versus freezing or other foul weather conditions.

In one embodiment, the algorithm discussed above, for determining a present status of an EP space, may include probability calculations for each time of the day, for example, at six minute increments. In such a scenario, a probabilistic determination is made which computes the probability that each EP space will be used by one of: an electric vehicle (EV), a plug-in hybrid-electric vehicle (PHEV), a preferred vehicle type (PVT), a conventional vehicle (CV) or a vacancy. At each six-minute increment, the system processor compares the computed probabilistic determinations with the current parking space availability rules or protocol established for the EP space. For example, these rules and protocols may include setting aside EP spaces for EVs and PHEVs only if there is a quantitative likelihood of X % or higher that an EP space will be utilized by an EV or PHEV during the next X hours. In other words, the system can define threshold likelihood that an EV will occupy an EP space within a prescribed time period. This threshold may be set by the EP sponsor (e.g., the municipality or parking authority). One system feature of note is that while the probability of use calculations described above may be the same throughout the system or at least on a region by region basis, the output, i.e., parking space availability status of each EP space, will depend upon the specific rules/protocols specified by the EP sponsor. To this end, another embodiment might entail the use of the system to audit the actual level of occupancy of EP spaces by various vehicle types (e.g., EVs, PHEVs, PTVs and conventional vehicles), and assessing whether and to what extent the specific rules/protocols specified by the EP sponsor are being met.

System Embodiment

Figure 1:
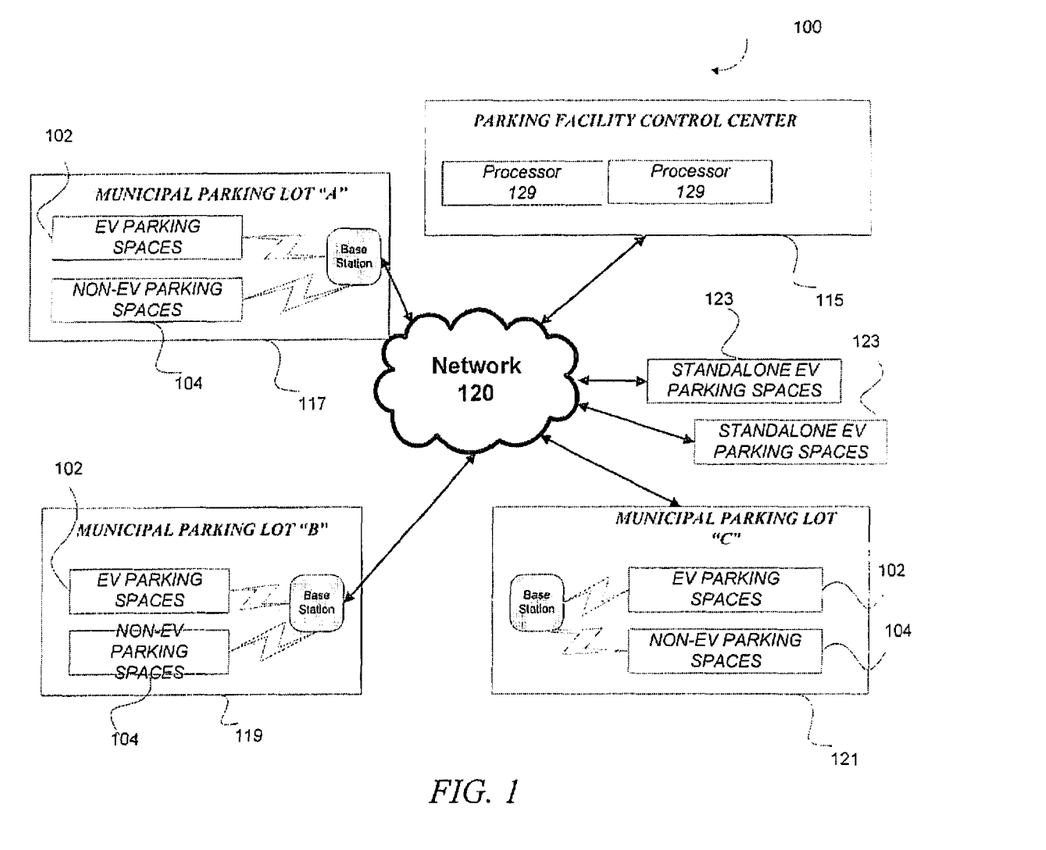
FIG. 1 illustrates a block diagram showing one embodiment of a system embodiment in accordance with the present disclosure for managing the availability of EP spaces, according to one embodiment.
Figure 3:
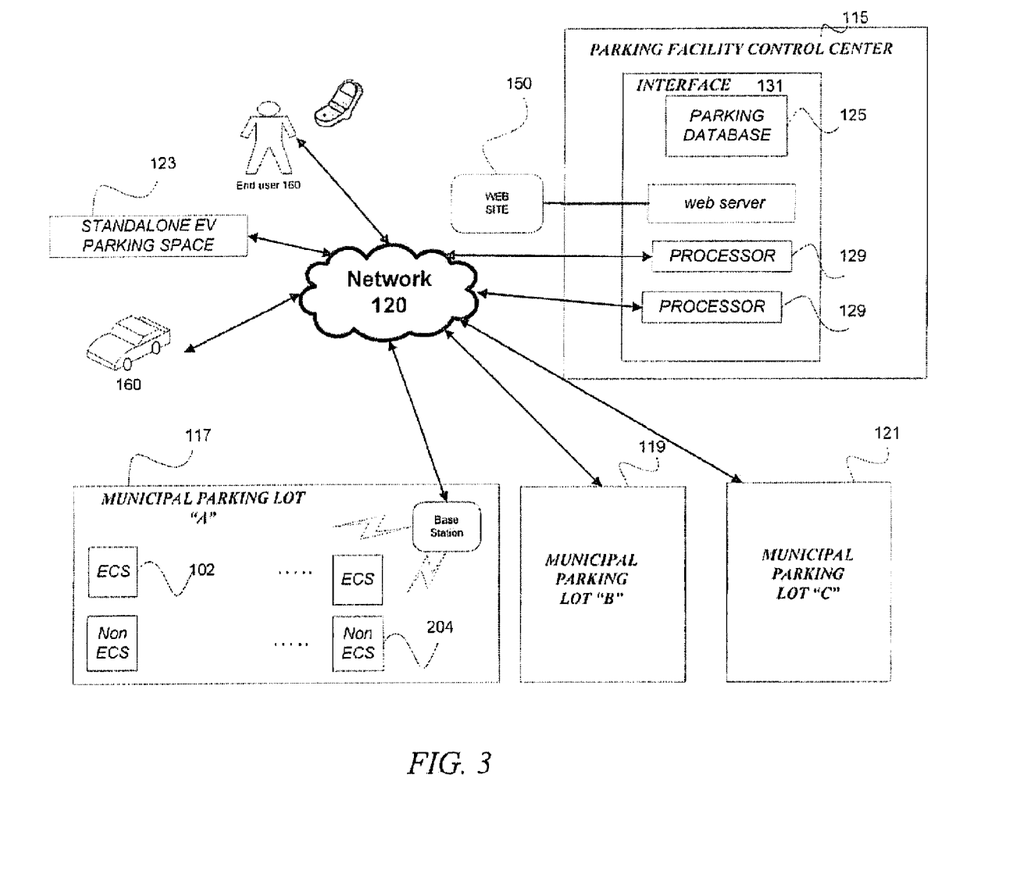
FIG. 3 is a more detailed diagram of the elements of the EP space management system shown in FIG. 1, according to one embodiment.

Referring now to the drawings, FIG. 1 illustrates an exemplary EP space management system 100 for managing the availability of EP spaces quipped with electric charging stations ("ECSs"). In FIG. 1, elements of EP space management system 100 comprise a parking facility control center 115 including one or more processors 129 that communicate with the EP spaces over a communication network 120, which may be 120 the Internet, wireless communication, mesh network, hard-wire and combinations of the foregoing and future envisioned systems The one or more processors 129 of parking facility control center 115, as shown in FIG. 3, receives, processes and generates data pertaining to various system management functions of the parking facility control center 115. The management functions include, for example, balancing dynamic changes in the demand and availability of EP spaces 102, 123 and non-EP spaces in the system 100. Toward this end, the system ensures that an adequate supply of EP spaces is provided at all times, without unduly limiting the supply of parking spaces available to conventional vehicles. When it is determined that there exists an excess supply of EP spaces 102, 123, the system may elect to change the status of one or more of the EP spaces from exclusive use to semi-restricted use or unrestricted use. The decision to transition the status of a parking space is determined by one or more algorithms that are programmed into the one or more processors 129 as computer code or instructions.

In one embodiment, it is contemplated to change the status of an EP space from exclusive use to semi-restricted use or unrestricted use based on the calculated aggregate demand in accordance with a set of current availability rules and/or protocols, which are changeable based on a set of factors that determine what constitutes an optimal mix of EP spaces reserved for the exclusive use of EVs and/or PHEVs, and without unduly limiting the supply of parking spaces available for conventional vehicles.

In one aspect, a computer implemented method for managing the availability of a plurality of EP spaces is implemented in one or more algorithms that are programmed into the one or more processors as computer code. The computer code comprising: determining by a processor a present demand for a plurality of EP spaces in a prescribed geographic region, retrieving data indicative of a historical demand for the plurality of EP spaces, predicting a future demand for the plurality of EP spaces, calculating by the processor an aggregate demand for the EP spaces in accordance with a demand profile based on the present, historical and calculated future demand for the EP spaces, and determining by the processor to convert at least one EP space from unrestricted use to semi-restricted use by EVs, PHEVs and one or more types of PVTs, or exclusive use by EVs and/or PHEVs based on the calculated aggregate demand. The computer implemented algorithm may further comprise providing a signal to an EP space display device indicating a change in status from unrestricted use to semi-restricted use or exclusive use by EVs and/or PHEVs. In some embodiments, the calculated predictive aggregate demand for the EP spaces is a weighted summation of the historical, present and future demand.

In some embodiments, the historical demand for the EP spaces may comprise various factors including historical use of EP spaces, with the ability to weigh more recent data more heavily and to identify trends and other patterns that will affect accuracy, variations by season, day or week and time of day. Other historical factors may include reservation history, specific user histories and weather history. Other factors may include, regional EV Market growth and how EV trends correspond to growth (these growth trends and correlations to EP use trends will likely differ significantly by regional market).

In some embodiments, the present demand for the EP spaces comprises various factors including, real-time or near real-time user location data, user queries regarding EP space availability and weather forecasts where the user queries are submitted from electric vehicle owners via one of the Internet or a smart-phone application and the future demand for the EP spaces comprises regional electric vehicle market growth trends. Other factors to consider are other parking apps that may be willing to share parking demand data.

In some embodiments, the calculating step performed by the processor is performed at prescribed time intervals. In one embodiment, the prescribed time interval is on the order of six minutes.

In one embodiment, it is contemplated to calculate a probability profile that computes the probability that an EP space will be occupied by one of an EV, PHEV, CV vehicle type and a probability calculation to determine EP vacancies, as shown below. These calculations are discussed further below with regard to the flowchart of FIG. 6.

Figure 6:
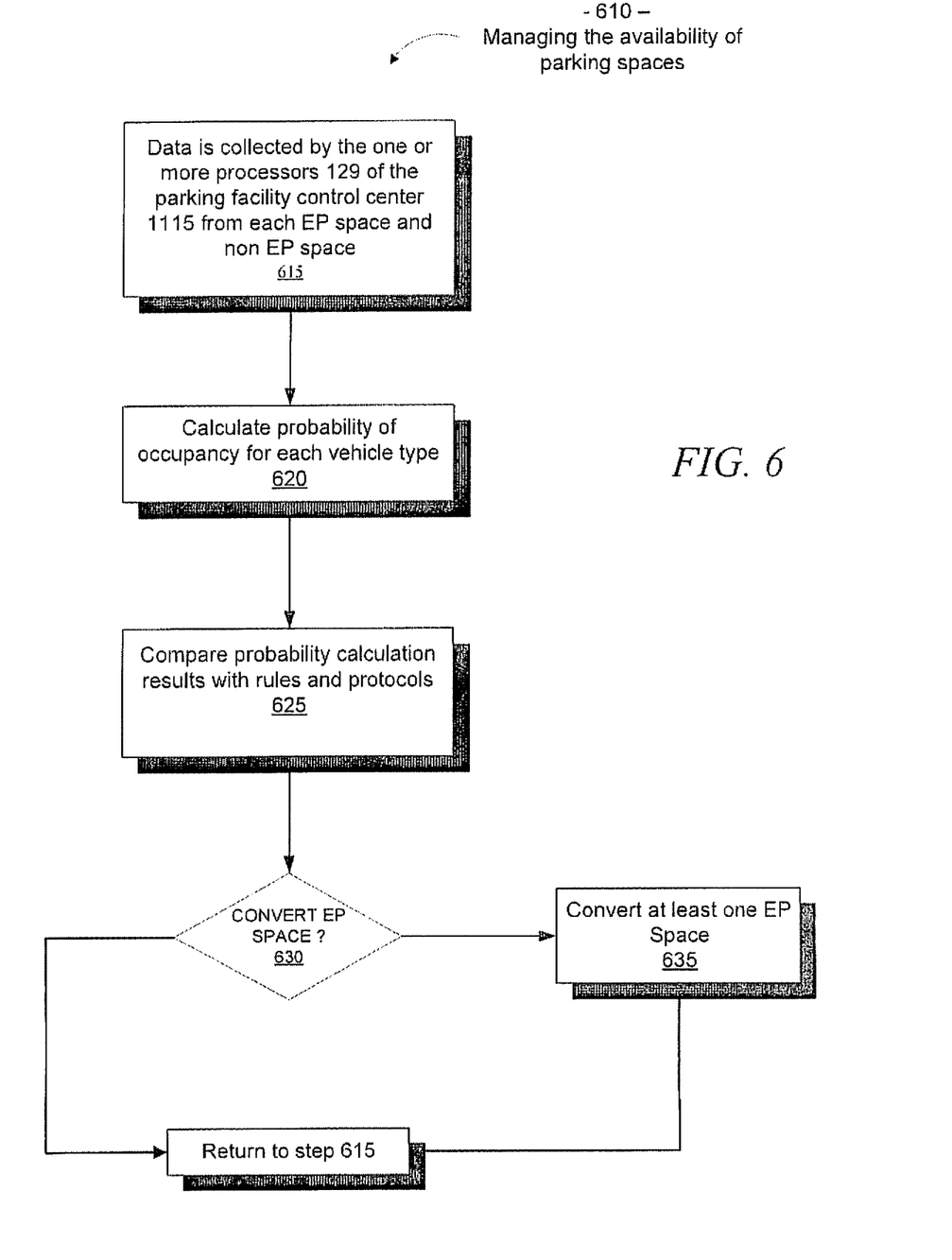
FIG. 6 is an operational flow diagram providing a functional overview of a process for managing the availability of parking spaces that are equipped with electric charging stations, according to one embodiment.

P(EV)=x %=probability that an electrified parking space will be occupied by an electrified vehicle (EV).

P(PHEV)=y %=probability that an electrified parking space will be occupied by a plug-in hybrid electrified vehicle (PHEV).

P(CV)=z %=probability that an electrified parking space will be occupied by a conventional vehicle (CV).

P(Vacant)=w %=probability that an electrified parking space will be vacant.

The probability calculations may be computed at specific time intervals throughout the day, for example, in one embodiment, calculations may be performed at nominally six minute increments. Other time increments are within contemplation of the disclosure with consideration to the amount of data to be processed from each parking location at each time interval.

By way of example only, the system may collect data at six minute intervals and perform calculations such as those described above. The system compares one or more probabilistic results with the current parking space availability rules and/or protocols established by the EP sponsor, which is typically the governing municipality or parking authority but may be any other authority such as a shopping center or parking garage owner or manager. The rules and protocols may include, for example, allocating EP spaces for EVs and/or PHEVs based on some quantitative measure. In one embodiment, the quantitative measure may specify that an EP space is allocated for exclusive use by EV and/or PHEV vehicles only in the case where there is a quantitative likelihood (probability), as computed above, of xx % or higher that an EP space will be utilized by an EV or HEV during the next X hours. In other words, quantitative measures may be employed to justify the transition of an EP space status from unrestricted use to exclusive use by an EV and/or PHEV. By comparing the rules and protocols to the probabilistic results, as defined above, a proper balance may be maintained for EP spaces between and among all vehicle types in accordance with the directions and priorities of the EP sponsor.

To facilitate the description of the disclosed system, some of the features in the electric charging stations ("ECSs") that communicate data to the parking facility control center 115 at discrete time intervals (e.g., six minutes) are described as follows.

Figure 2:
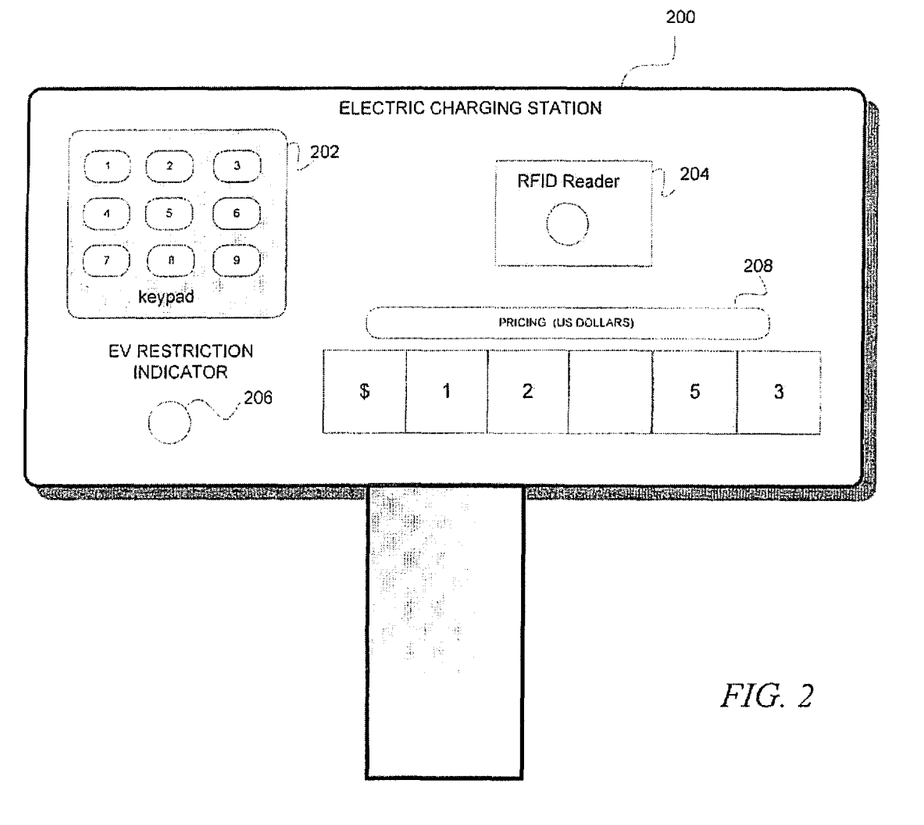
FIG. 2 is a diagram illustrating an electric charging station according to one embodiment.

As shown in FIG. 2, according to one embodiment, each electric charging station (ECS) 200 is equipped with two modules, shown as a key pad 202 and an RFID reader 204 that enables the electric charging station to recognize and confirm the identity of the user, and vehicle-type associated with that user, as appropriate. In other embodiments, other devices and combinations thereof may be utilized for performing user recognition and confirmation processes. In addition, each EP space 102, 123 (see FIG. 1) or group of EP spaces is equipped with a user signaling device for identifying to a user whether the EP space is restricted for the use of EVs and/or PHEVs, or available for use by non-electrified vehicles. For example, in one embodiment, the identification device may be a remotely controlled LED sign or signal light 206. Other methods of signaling the immediate availability of the parking space might include querying a service using a hand-held device such as a smart-phone and displaying the EP space status on the hand-held device. The ECS may also include a general purpose module for displaying changeable pricing 208 or other information. For example, pricing may be altered based on time of day usage (peak/off-peak demand), municipality load balancing concerns based on weather considerations, etc. Pricing may also increase when the charge is completed and there is demand for the space by another EV or PHEV.

Exemplary EPS Management System

With reference now to FIG. 3, there is shown a more detailed illustration of the exemplary EP space management system 100. FIG. 3 shows end users 160, standalone 123 electric charging stations, multiple electric charging stations 202 and conventional parking spaces 204 which may be associated with one of the exemplary municipal parking lots 117, 119, 121 shown in FIG. 1 which communicate with the one or more processors 129 of the parking facility control center 115 to receive and forward data to/from database 125. The various entities communicate with the one or more processors 129 of parking facility control center 115 via communication network 120.

Database and Database Tables Parking database 125 can be of a variety of different database types, including, without limitation, relational, object-relational, and object-oriented databases. Database interface 131 manages the data resident in the parking database 125, and thus stores, retrieves, maintains, and performs the requisite processing of the data stored in the parking database 125 as required. The database interface 131 also provides an interface so that entities external to the parking database 125 can add or delete data, perform data processing and maintenance, and respond to database queries and commands. The interface 131 may be implemented by the same processor as parking database 125 or one or more separate processors. Parking database 125 communicates with an ECS situated at each EP space 102, 123.

The parking database 125 is used to accumulate data to be stored in one or more data tables. In one aspect, the stored data may be used as input for calculating the probability equations described above.

Figure 4:
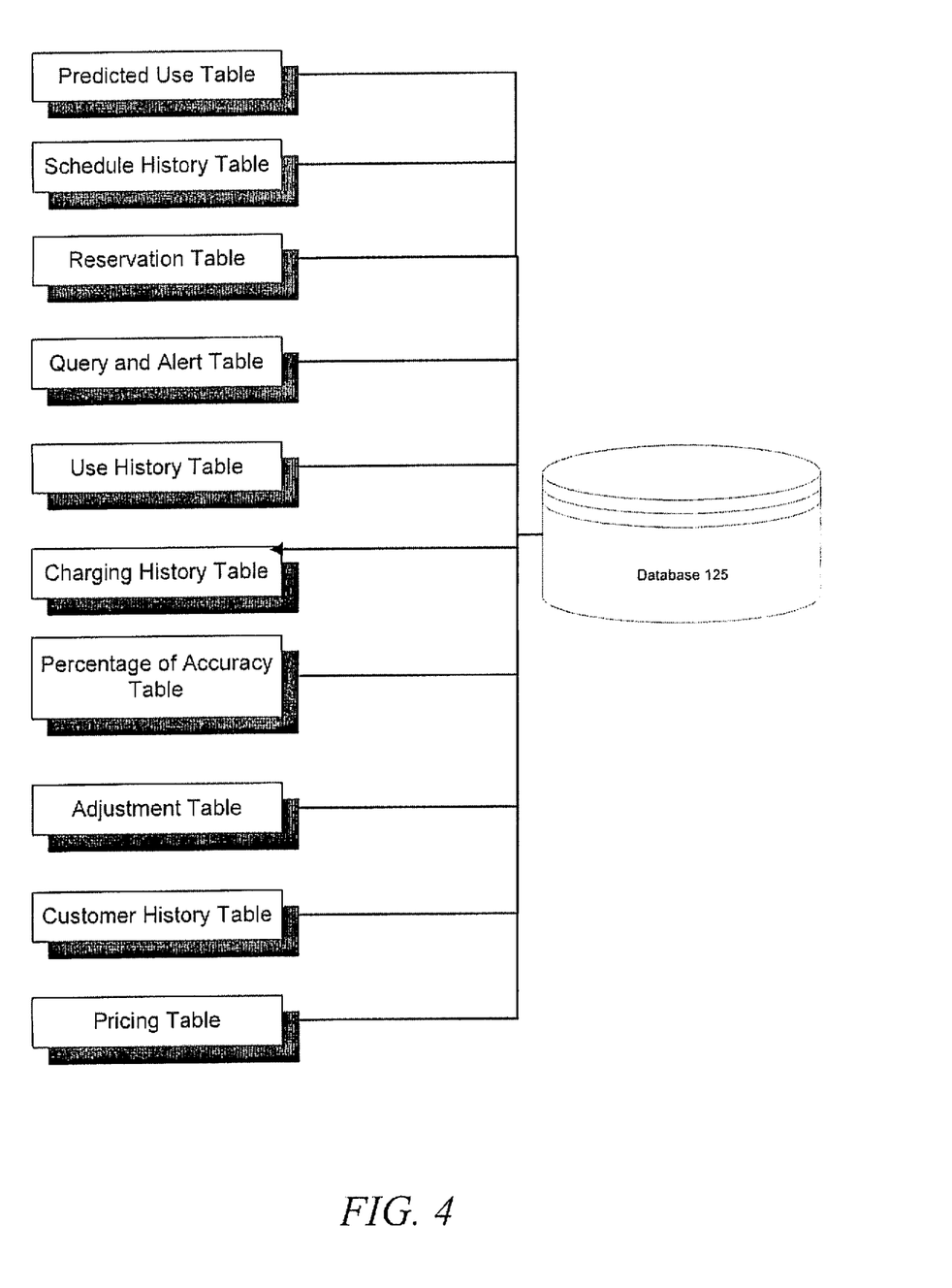
FIG. 4 illustrates various data tables that are stored in the parking system database, according to one embodiment.

FIG. 4 illustrates various data tables to be stored in database 125. In one embodiment, the data tables may include
a Predicted Use Table,
a Schedule History Table,
a Reservation Table,
a Query and Alert Table,
a Use History Table,
a Charging History Table,
a Percentage of Accuracy Table,
an Adjustment Table,
a Customer History and Current Location Table and
a Pricing Table.

The data tables are configured to store data required to perform analytical processes such as, computing the probabilities that the EP space will be occupied by one of an EV, a PHEV, a PVT, a CV or no vehicle at all (vacancy). The data tables also serve to store schedule history data, reservation data, user history data, pricing data, charging history, query alerts and so on. A more complete description of data tables which may be used in embodiments of the disclosure are described as follows.

A. Predicted Use Table—stores calculated results of the probability calculations described above at the prescribed update interval (e.g., six minutes). As stated above, the calculated probabilistic results provide a quantitative indication of the probability that each vehicle type will utilize a particular EP space over time. In the exemplary embodiment, probability calculations are performed in six minute intervals over each 24 hour cycle resulting in 240 records per day per EP space. Each of the 240 records are comprised of 5 or more fields for storing the calculated probabilistic result for each vehicle type (e.g., EV, PHEV, defined PVTs, conventional vehicle, and no use). The total number of fields will depend upon the number of preferred vehicle types the sponsor entity wants to include in the vehicle use mix.

B. Schedule History Table—stores a historical record of the availability settings for each EP space as reflected by the availability indicator.

C. Reservation Table—stores real-time status of reservations for each EP space and includes look-ahead information for some number of days in which a reservation may be made with the system.

D. Query and Alert Table—stores all user queries received via the Internet or smart-phone apps, and for each EP space stores both turn-downs by time increment and requests from users that they be alerted when an EP space becomes available.

E. Use History Table—stores a historical record of actual use for each EP space. The information stored in this table may also include whether the EP space was obtained by reservation, whether the EP space was obtained following a user query or alert message, etc. This information is also available for report generation pertaining to the usage of each EP space on a daily basis. In the exemplary embodiment, at a minimum, data is stored for each six minute increment describing whether the EP space was vacant or occupied and by what vehicle type, if known. The table may also optionally store whether the EP space is being used by an EV during a time the EP space status is unrestricted. In some embodiments, the history table may record those instances where an EV or PHEV parks in an EP space but does not elect to charge the vehicle, such as when the vehicle owner is only interested in the priority parking location.

F. Charging History Table—stores a historical record of actual use of the ECS (i.e., the time a vehicle is charging at each EP space). Data may be recorded in actual usage increments or otherwise rounded to the nearest six minute increment. The data is used in conjunction with both the billing and dynamic pricing functions, as well as in calculating present or future demand and in scheduling and prioritizing charging sessions among multiple vehicles in certain embodiments of the disclosure.

G. Percentage of Accuracy Table—stores a calculated result of the relative accuracy of each probabilistic prediction regarding contemplated EP space demand and actual use. The data from this table will be used to incrementally adjust projected use calculations and improve accuracy over time.

H. Adjustment Table—stores information about the seasonal, day-of-week and time-of-day differences in EP space demand. This table may also store additional data that may be used to determine whether to give greater or lesser weight to certain algorithmic calculations, or whether to overrule results that the algorithm might otherwise generate. The data for this table may be customized for each EP space based upon a checklist completed by the EP sponsor, or could otherwise be formulated automatically based upon pre-set preferences that would be applicable to an EP location profile (e.g., a city street, commuter parking lot, shopping center parking lot, etc.).

I. Customer History and Current Location Table—stores information about each user from the user's vehicle profile information, including, without limitation, vehicle year, model, VIN, State of registration, Tag number, and in the case of an EV owner, the type of charger required, payment preferences, contact information and contact preferences. Store and periodically update customer's current location derived from smart phone or other real-time or near real-time locational data source. In addition to the static information described above, this table may also store EP space use history to include charging locations used by each user including frequency of each use, usual times and duration of charges and reservation history, including likelihood of cancelling reservations.

J. Pricing Table—stores applicable prices for the use of a charging space, including pricing variations in accordance with time-of-day and day-of-week, prices for the use of an EP space during times at which a vehicle is not charging. This latter pricing is variable dependent upon whether another EV user has requested to be alerted when the EP space becomes available. This table also stores prices for use by PHEVs and by PVTs, which will vary depending on whether an EV user has requested to be alerted when an EP space becomes available.

In illustrative embodiments of the present disclosure, at least a portion of the stored data in database 125 is searchable via a website and smart-phone apps maintained as part of the EP space management system 100. At least a portion of the stored data is also made available to other websites, search engines, navigation services, smart phone apps, for display on maps or through other delivery options. Information stored in parking database 125 can be communicated from the parking facility control center parking database 125, to an end user 160, such as a person en-route to a location where he or she will seek parking. Conversely, the system can query the smart phone of regular customer to determine the customer's current location and likelihood of using an EP space. The information can be provided by a variety of transmission modalities and in a variety of formats according to various embodiments of the present disclosure.

In at least one embodiment, information can be provided to an end user 160 by wireless communication to a receiving device of the end user 160 for display on an electronic map, such as those provided in navigation systems, over the Internet, and on some cell phones, personal digital assistants (PDAs), handheld computers, personal navigation devices or the like wherein a graphical indication of predicted space availability can be provided. Alternatively, the information may be provided to an end user 160 via text messages and/or voice communication, for example.

In an embodiment, portions of parking database 125 may be updated by end users 160. In another embodiment, the parking database 125 may be a distributed database having portions of the stored information distributed among several repositories, which may include, without limitation, the various ECS located throughout a municipality.

Parking facility control center 115 may further comprise a server device, such as web server 127. Web server 127 is implemented as any suitable hardware and software capable of providing web services for sending/receiving data transmissions to/from the electric charging station (ECS) at each EP space. Web server 127 includes computer applications and files for managing and storing operations associated with the parking facility control center 115.

Parking facility control center 115 may further comprise a website 150 which may be associated with local database 125 to facilitate searches performed by end users for at least a portion of the data stored in parking database 125. Preferably, an end user sends a query through the Internet to the parking facility control center 115. The end user, however, may send the query through other routes, such as through a direct connection to the parking facility control center 115 or through another network. Parking database 125 preferably stores data relevant to allowing an end user to determine the availability of EP spaces. The data may include, for example, the locations of participating EP spaces, identifying information about the specifications of the ECS serving an EP space, such as, voltage, connector type, network or owner, real-time availability status, anticipated availability, usage history, pricing. The data may also include, for example, whether an EP space is reserved for specific users during certain times of the day or week.

Exemplary EP and Non EP Space Allocation

Figure 5:
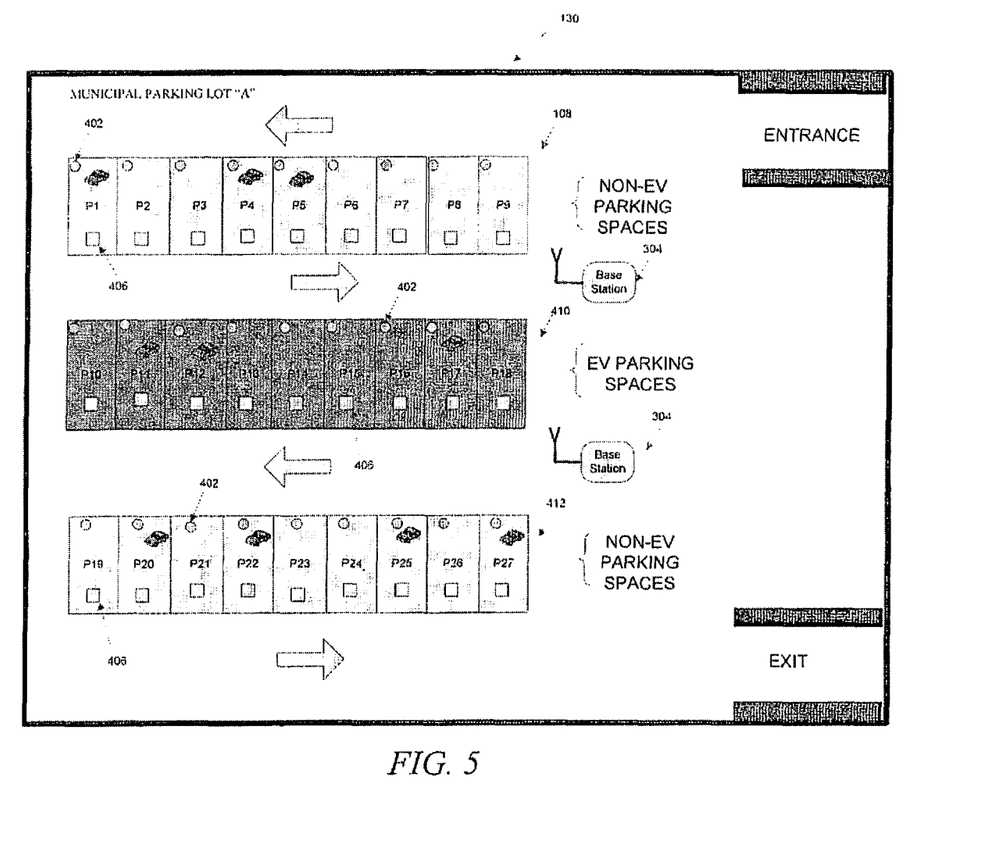
FIG. 5 is a more detailed diagram of the elements of the EP space management system shown in FIG. 1, according to one embodiment.

FIG. 5 is a detailed illustration of an exemplary municipal parking lot "A" 117. Lot "A" is shown to include three rows, a top, middle and bottom row, where each row includes some number of parking spaces. In the top row 508, the parking spaces are numbered P1-P9. In the middle row 110, the parking spaces are numbered P10-P18 and in the bottom row 112, the parking spaces are numbered P19-P27. The parking spaces in the top and bottom rows 508, 512 are designated as non-EP spaces, which are available to all vehicle types. The middle row 510 includes nine EP spaces P10-18 by way of example only. In the top row 508, parking spaces P1, P4 and P5 are shown, by way of example, to be occupied by conventional vehicles. In the middle row 510, the EP spaces P11, P12 and P17 are shown to be presently occupied by EVs or PHEVs and in the bottom row, 512 parking spaces P20, P22, P25 and P27 are shown to be presently occupied by conventional vehicles.

The status of an EP space, such as those shown in the middle row (P10-18) may dynamically change over the course of time from exclusive status to semi-restricted status to unrestricted status, in any order, in accordance with a computer based algorithm executable on a system processor that computes a dynamically changing demand profile for the parking spaces. In one aspect, the algorithm is configured to manage the availability of EP spaces P10-P18 such that an adequate supply of locations for charging EVs and/or PHEVs and for accommodating PVTs is maintained without unduly limiting the supply of parking spaces available for conventional vehicles.

Each EV parking space in the middle row P10-P18 includes an electronic charging station (ECS), such as the one shown in FIG. 2. The ECSs accommodate the special charging needs of EVs and PHEVs. More particularly, each EV space in the middle row 510 includes a dedicated stand-alone automatic electronic charging station (ECS) 200 (not shown) capable of charging an array of electric automobile power systems including batteries, capacitors and flywheels with different species of charging power to meet the broad requirements of the driving public. The species can be easily expanded or modified to meet changing charging mores to be expected in the future.

The ECS 200 via a computer screen interrogation of the customer determines the nature of the charge desired and modifies a supply of electricity to meet and deliver precisely that amount to the connected automobile. The data will have a bearing on whether the end user will attempt to utilize an unutilized EP space. Whenever an EP space is in use or reserved for use, the system 100 is updated in real-time to reflect that the EP space is unavailable. In one embodiment, updates occur substantially on the order of 6 minute intervals.

In one embodiment, parking facility control center 115 periodically collects data pertaining to current user demand for both EP spaces 102, 123 and non-EP spaces 104 in each of the participating parking areas or lots 117, 119, 121 and standalone parking areas 123 in the system 100.

Each parking position P1-P27 in the municipal parking lot "A" has mounted at one side a casing 102 holding a transceiver (not shown) for remotely communicating with the parking facility control center 115, via base space transceiver 304. In the embodiment shown in FIG. 5, radio transmission is directed from transmit aerials (not shown) of the individual parking positions P1-P27 to one or more of the line-of-sight base space transceivers 304. In the illustrative embodiment, parking availability detectors 306 detect the presence or absence of vehicles in a particular parking space or area. The detectors 306 communicate parking availability data, via a base space transceiver 304 to one or more processors 129 associated with the parking facility control center 115.

In some embodiments, whenever an EP space or non-EP space becomes available, the system can broadcast the availability to EV, PHEV, PVT and conventional vehicle owners over a prescribed region.

The processors 129 associated with the parking facility control center 115 are coupled to a memory (not shown), such as a random access memory (RAM). The processor is operatively coupled to a display which presents images such as windows to a user on a graphical user interface. The processor 129 may be coupled to other devices, such as a keyboard, a mouse device, a printer, etc. Of course, it should be recognized that any combination of the above components, or any number of different components, peripherals, and other devices, may be used with the processor 102. Processors 129 communicate with database 125. Processors 129 perform a variety of functions including executing various computer programs that affect operational modes of the various parking areas or lots 117, 119, 121 and standalone parking areas 123.

Although the present disclosure is generally described with respect to detectors, such as sensors, various embodiments of the present disclosure can utilize virtually any type of communicating parking vacancy information and communicate it to processor 129. For example, parking lot operators may manually determine and manually report the number of spaces available in a parking lot, or that the number of vehicles in the lot is indirectly determined by counting or detecting vehicles which arrive and/or depart from a given parking lot. Alternatively, the detectors may be any type of sensor, including machine visions systems, which are capable of detecting the presence or absence of a vehicle in a lot or space.

EP space management system 100 enables queries of available EP spaces in a geographic area based on the location of the user's vehicle or alternatively the user's smart phone or other similar device. Queries and availability histories are recorded in parking database 125 and used in an algorithm to determine whether EP space supply is tracking demand in a given area. The information also provides locations and times when demand for EP spaces exceeds supply, and suggest alternate locations to a querying user.

Authentication

In one aspect, EP space management system 100 authenticates vehicles to determine their category type. As discussed above, during certain designated periods, only certain vehicle category types are allowed to park in an EP space. One method of authentication is to pre-register the vehicle's license plate number and vehicle identification number ("VIN"). This information would be stored in the management system database and be made available to parking attendants or parking enforcement personnel whose function is to ensure that only qualified vehicles, as determined by category type, are parking in an EP space. For example, at times when the status of an EP space is set to semi-restricted, and certain PVTs are permitted to use the space, the system will allow users of registered vehicles that meet the PVT eligibility criteria to use the space.

In one embodiment, to facilitate enforcement and to prevent ineligible vehicles from occupying the space by using the login, swipe-card or RFID of an eligible PVT, the system will display the license plate number of the registered vehicle. In this manner, a parking attendant only needs to compare the vehicle plate number as it appears on the system display, with the license plate on the vehicle, to confirm that the vehicle is qualified to use the EP space.

In one embodiment, the license plate number may be communicated to parking attendants or parking enforcement personnel by means including, but not limited to, smart phones, text message queries, the Internet.

In a variation on the embodiment described above, the system may employ RFID tags and readers to read the license and VIN indicia. However, regardless of how the license and VIN information is acquired, a qualification procedure must be performed.

Notifications

In an embodiment, it is contemplated to allow an EV or PHEV to remain in a parking space whose status is semi-restricted use by EVs, PHEVs and one or more PVTs.

Operation

An illustrative embodiment of the present disclosure according to one embodiment is described with reference to the process flow diagram shown in FIG. 6. In this process 610, the parking facility control center 115 manages the availability of EP spaces such that an adequate supply of locations for charging EVs and/or PHEVs, and accommodating PVTs is maintained, without unduly limiting the supply of parking spaces for conventional vehicles.

At step 615, data is collected by the one or more processors 129 of the parking facility control center 115 from each of the EP spaces 102 and non-EP spaces 104 pertaining to availability and usage.

At step 620, the one or more processors 129 of the parking facility control center 115 performs probability calculations at a prescribed pre-determined time interval to provide a quantitative indication of the probability that each vehicle type will utilize a particular EP space at that time interval. In one embodiment, a probabilistic calculation will be performed for the four or more vehicle types and a fifth or more probability result will be computed corresponding to the probability that no vehicles occupy an EP space for the prescribed time interval. In particular, four or more calculations are performed including—

P(EV vehicle type occupies an EP space @ time interval x),
P(PHEV vehicle type occupies an EP space@ time interval x),
P(PVT vehicle type occupies an EP space@ time interval x),
P(a CV vehicle type occupies a EP space@ time interval x)
P(NO vehicles occupy the EP space@ time interval x).

At step 625, the five or more probabilistic results are compared with a set of current parking space availability rules and/or protocols established by the EP sponsor. For example, these rules and protocols may include setting aside electric parking spaces for EVs and/or PHEVs only if there is a quantitative likelihood of xx % or higher that an EP space will be used by an EV or PHEV during the next X hours.

At step 630, a determination is made regarding whether to convert one or more EP spaces from exclusive use by EVs and/or PHEVs, to semi-restricted use by EVs, PHEVs and one or more PVTs, to unrestricted use by all vehicle types. The determination is based on a number of considerations including, but not limited to: (1) historical use of an EP space with the ability to weigh recent data more heavily and to identify trends and other patterns that will affect accuracy, variations by season, day or week and time of day; (2) regional EV and PHEV Market growth and how such trends correspond to growth (these growth trends and correlations to EP space use trends will likely differ significantly by regional market); (3) queries supplied by EV and PHEV owners via the web or a smart-phone app in addition to other parking apps that may be willing to share parking demand data; (4) reservation history; (5) specific user history; (6) weather forecasts and history. These considerations are presented as exemplary; (7) real-time and/or near real-time locational data.

At step 635, where it is determined at step 630 that it is necessary to convert one or more EP spaces from exclusive use by EV and/or PHEV vehicles to semi-restricted use to include one or more PVTs, or unrestricted use to include all vehicle types, the system will convert some number of EP spaces to provide an appropriate mix of uses of EP spaces in satisfaction of the rules and protocols established by the EP sponsor. In one embodiment, results describing which EP spaces to be converted are displayed on a computer screen of an operator of the parking facility control center 115. The operator can respond to the prompt by sending an appropriate electronic signal to the remote EP locations identifying to all users from that point forward that the EP space is no longer restricted for exclusive use by EVs and/or PHEVs. As described above, in one embodiment, the identifying indicia can be a remotely controlled LED sign or signal light 206 on the electric charging station, such as the one shown in FIG. 2.

Account Maintenance

One feature of the EP space management system is to allow individuals to maintain accounts on the system from which they can reserve a participating EP for a specific period of time. Upon reserving an EP space on the system, the system provides the member with a numerical code which when entered into a device at the EP space at or about the scheduled time activates the ECS. Various methods may be utilized for providing the numerical code, including, but not limited to, email, SMS text message, smart phone app or other option of the user's preference. Alternatively, RFID, proximity card, NFC device, magnetized strip, RFID tag on the vehicle, EZ-Pass transponder are all viable options for providing the numerical code.

Once a charging session on an EP space has been scheduled, the status of the EP space is updated to reflect that the EP space will be unavailable for a period of time. The system may charge a member's account if the member fails to use a space that has been reserved. Additionally, the system may be designed to permit other fees to be charged, including higher charges if the vehicle is left in the space longer than either the reserved time, or beyond the grace period allowed following the completion of the charge, or parking fees for the use of the EP space by a conventional vehicle. This amount may vary depending upon whether the system records other demand for the space during time used beyond the reservation period. Anytime the EP space is in use, the system is updated in real time to reflect that the EP space is unavailable.

The system allows owners or sponsors of the charging spaces to set the conditions applicable to each EP space under their ownership or control, including pricing, availability, conditions under which availability of the space may be converted from being restricted to electric vehicles to conventional vehicles, and provides default or customized algorithms that can be used to comply with conditions set by a municipality or private property owner. For example, a municipality may impose a condition on sponsors of on-street EP spaces requiring that no more than one EP space be kept open for the exclusive use of EVs and/or PHEVs unless the space is reserved for use within a pre-designated period of time, or unless historical data reflects that more than one space is typically needed for EVs on that particular day of the week and time of day. The purpose of such conditions is to limit objections from conventional vehicle owners who might resent undue restrictions on available parking.

The present disclosure could be produced in hardware or software, or in a combination of hardware and software. Various components of the system and method according to the present disclosure may be produced in a single computer system having separate elements or means for performing the individual functions or steps described or claimed or one or more elements or means combining the performance of any of the functions of steps disclosed or claimed, may be arranged in a distributed computer system or information processing system or information processing unit, interconnected by any suitable means.

The system and method described in the present disclosure are not limited to any particular kind of computer system but may be used with any general purpose computer, arranged to perform the functions described and the method steps described. The operations of such a computer, as described above, may be according to a computer program contained on a medium for use in the operation or control of the computer. The computer medium which may be used to hold or contain the computer program product may be a fixture of the computer such as an embedded memory or may be on a transportable medium such as a disk.

Embodiments of the present disclosure may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the present disclosure. Other instructions and operations required to implement the described disclosure may also be stored on the machine-readable medium. Software running from the machine readable medium may interface with circuitry to perform the described tasks.

The present disclosure is not limited to any particular computer program or logic or language, or instruction but may be practiced with any such suitable program, logic or language, or instructions. Without limiting the principles of the disclosed disclosure any such computing system can include, inter alia, at least a computer readable medium or product allowing a computer to read data, instructions, messages or message packets, and other computer readable information from the computer readable medium.

Furthermore, the computer readable medium may include computer readable information in a transitory state medium such as a network link and/or a network interface, including a wired network or a wireless network that allow a computer to read such computer readable information.

The present disclosure teaches a novel system and method for managing the availability of EP spaces such that an adequate supply of locations for charging EVs and/or PHEVs is maintained, while minimizing the number of parking spaces made unavailable to vehicles that don't need to charge.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications that are suited to the particular use contemplated. It is intended that the scope of the disclosure be defined by the claims appended hereto and their equivalents.

What is claimed is:

1. A computer implemented method for managing by a vehicle management system, the availability of a plurality of electrified parking (EP) spaces, the method comprising:

retrieving by a communication module of the vehicle management system, previously stored data indicative of a present demand for said plurality of (EP) spaces in a prescribed geographic region, retrieving by the communication module of the vehicle management system, previously stored data indicative of a historical usage and demand for said plurality of (EP) spaces, calculating by a processor of the vehicle management system, an aggregate predicted present demand for said plurality of (EP) spaces in accordance with a demand profile based on said data indicative of said present demand for said plurality of EP spaces and said data indicative of said historical usage and demand for said plurality of EP spaces, and determining by the processor of the vehicle management system, based on said calculated aggregate predicted present demand, whether to change a usage designation for at least one EP space from among said plurality of EP spaces from restricted use for only electrified vehicles to non-restricted use for electrified and non-electrified vehicles.

2. The method according to claim 1, further comprising collecting data pertaining to usage designations for a plurality of EP spaces, said data identifying usage status according to vehicle type over a period of time.

3. The method according to claim 1, further comprising registering the non-electrified vehicle with the vehicle management system.

4. The method according to claim 3, wherein registration comprises registering a user's VIN and license plate number.

5. The method according to claim 4, wherein said user queries are submitted from users via one of the Internet or a smart-phone application.

6. The method of claim 5, wherein said at least one parking space rule and/or said at least one parking space protocol is changeable based on at least one factor for determining whether to change a usage designation label for at least one EP space from restricted use for only electrified vehicles to non-restricted use for electrified and non-electrified vehicles that determine what constitutes an adequate combination of EP spaces and non EP spaces.

7. The method according to claim 1, further comprising the step of changing said usage designation for said at least one EP space from among said plurality of EP spaces from restricted use for only electrified vehicles to non-restricted use for electrified and non-electrified vehicles in the case where said aggregate demand from electrified vehicles is insufficient to fully utilize a totality of spaces presently designated as exclusively EP spaces.

8. The method according to claim 1, further comprising a step of identifying data predictive of a future demand for said plurality of EP spaces.

9. The method of claim 1, wherein said data indicative of said historical demand and usage for said plurality of (EP) spaces comprises at least one of data indicative of historical use of said EP spaces, data indicative of a reservation history of said EP spaces, specific user histories associated with said EP spaces, weather history, data indicative of historical use associated with spaces in said prescribed geographic region other than said plurality of EP spaces.

10. The method of claim 1, wherein said present demand for said (EP) spaces comprises at least one of: user queries regarding EP space availability associated with said plurality of EP spaces, active reservations from users for said plurality of EP spaces.

11. The method according to claim 1, wherein the calculated aggregate predicted present demand for the (EP) spaces is a linear combination of said historical and present demand.

12. The method of claim 1, further including the step of providing a signal to an EP parking space display device indicating a change in usage designation from an EP space from restricted use for only electrified vehicles to non-restricted use for electrified and non-electrified vehicles.

13. The method of claim 1, further including the step of updating a database to indicate a change in status for at least one EP space from restricted use for only electrified vehicles to non-restricted use for electrified and non-electrified vehicles.

14. The method of claim 1, wherein the calculating step is performed at prescribed time intervals.

15. The method of claim 1, further including a step of modifying said processor determination to change a usage designation label for at least one EP space from restricted use for only electrified vehicles to non-restricted use for electrified and non-electrified vehicles in accordance with at least one parking space availability rule and/or at least one parking space protocol.

16. A parking space vehicle management system comprising: a parking facility control center configured to process information collected from a plurality of parking spaces including a first subset of parking spaces reserved for electrified vehicles (EP spaces) and a second subset of parking spaces reserved for non-electrified vehicles (non EP spaces), the parking facility control center including:

a processor operative to:
retrieve previously stored data indicative of a present demand for said plurality of (EP) spaces in a prescribed geographic region,
retrieve previously stored data indicative of a historical usage and demand for said plurality of (EP) spaces,
calculate an aggregate predicted present demand for said plurality of (EP) spaces in accordance with a demand profile based on said data indicative of said present demand for said plurality of EP spaces and said data indicative of said historical usage and demand for said plurality of EP spaces,
determine, based on said calculated aggregate predicted present demand, whether to change a usage designation for at least one EP space from among said plurality of EP spaces from restricted use for only electrified vehicles to non-restricted use for electrified and non-electrified vehicles.

17. The parking space vehicle management system of claim 16, further comprising:
a database, communicatively coupled to said processor, for storing:
said previously stored data indicative of a present demand for said plurality of (EP) spaces in a prescribed geographic region, and
said previously stored data indicative of a historical usage and demand for said plurality of (EP) spaces,
a database interface configured to manage the data stored in the parking database.

18. The parking space vehicle management system of claim 16, further comprising: a plurality of electrified charging stations associated with the respective corresponding plurality of EP spaces.

19. The parking space vehicle management system of claim 16, wherein the plurality of tables includes a first table for storing calculation results including:
data indicating that an electrified vehicle will use each of a plurality of EP spaces at a prescribed time interval,
data indicating that a PHEV will use each of the plurality of EP spaces at said prescribed time interval,
data indicating that a PVT will use each of the plurality of EP spaces at said prescribed time interval,
data indicating that a non-electrified vehicle will use each of the plurality of EP spaces at said prescribed time interval, and
data indicating that that no vehicles will use each of the plurality of EP space at said prescribed time interval.

20. The parking space vehicle management system of claim 16, wherein the plurality of tables further includes a second table for storing historical data indicating of the availability of a plurality of EP spaces over a prescribed time period.

21. The parking space vehicle management system of claim 16, wherein the plurality of tables includes a third table for storing reservation requests for a plurality of EP spaces.

22. The parking space vehicle management system of claim 16, wherein the plurality tables includes a fourth table for storing: queries from users for at least one EP space, and requests from users to be alerted when an EP space becomes available.

23. The parking space vehicle management system of claim 16, wherein the plurality tables includes a fifth table for storing actual use data associated with each of the plurality of EP spaces.

24. The parking space vehicle management system of claim 16, further comprising a web server connected to the Internet, whereby said server provides one or more computer applications, whereby said one or more computer applications manages and stores operations associated with the parking facility control center.

25. The parking space vehicle management system of claim 16, further comprising a web site for facilitating user searches of at least a portion of the data stored in the parking database.

* * * * *